United States Patent [19]

Schuurman

[11] 4,202,672

[45] May 13, 1980

[54] APPARATUS FOR GASIFICATION OF FINELY DIVIDED FUEL

[75] Inventor: Pieter J. Schuurman, The Hague, Netherlands

[73] Assignee: Shell Internationale Research Maatschappij B.V., Netherlands

[21] Appl. No.: 854,650

[22] Filed: Nov. 25, 1977

[30] Foreign Application Priority Data

Dec. 24, 1976 [GB] United Kingdom ............... 54037/76

[51] Int. Cl.² ............................................. C10J 3/86
[52] U.S. Cl. ......................................... 48/77; 48/67;
    48/87; 48/126; 165/81; 422/202; 422/208
[58] Field of Search ....................... 48/77, 76, 63, 101,
    48/120, 123, 126, 67, 61, 64, 87; 110/28 J, 31;
    122/4 D, 5; 165/81, 82; 201/31; 202/134;
    23/288 M, 288 S, 277 R, 284; 422/202, 208

[56] References Cited

U.S. PATENT DOCUMENTS

| | | | |
|---|---|---|---|
| 3,119,379 | 1/1964 | Sweeney | 110/28 J |
| 3,130,146 | 4/1964 | Plaster | 23/284 |
| 3,409,074 | 11/1968 | Wagner et al. | 23/288 M |
| 3,910,235 | 10/1975 | Highley | 122/4 D |
| 4,057,396 | 11/1977 | Matovich | 23/284 |

FOREIGN PATENT DOCUMENTS

566869 12/1958 Canada ..................................... 48/123
986681 3/1965 United Kingdom .................. 165/81

Primary Examiner—Richard V. Fisher
Assistant Examiner—George C. Yeung
Attorney, Agent, or Firm—Pravel, Gambrell, Hewitt, Kirk, Kimball & Dodge

[57] ABSTRACT

A coal gasification reactor is disclosed which includes a gasification chamber surrounded by a pressure shell, a tubular quench section above the gasification chamber and a superposed waste heat boiler. Heat expansive members are provided in the form of bellow type expansion members between the waste heat boiler and the quench section as well as between the quench section and the gasification chamber to absorb or compensate for relative thermal expansion differences due to the temperature ranges involved in gasification.

2 Claims, 1 Drawing Figure

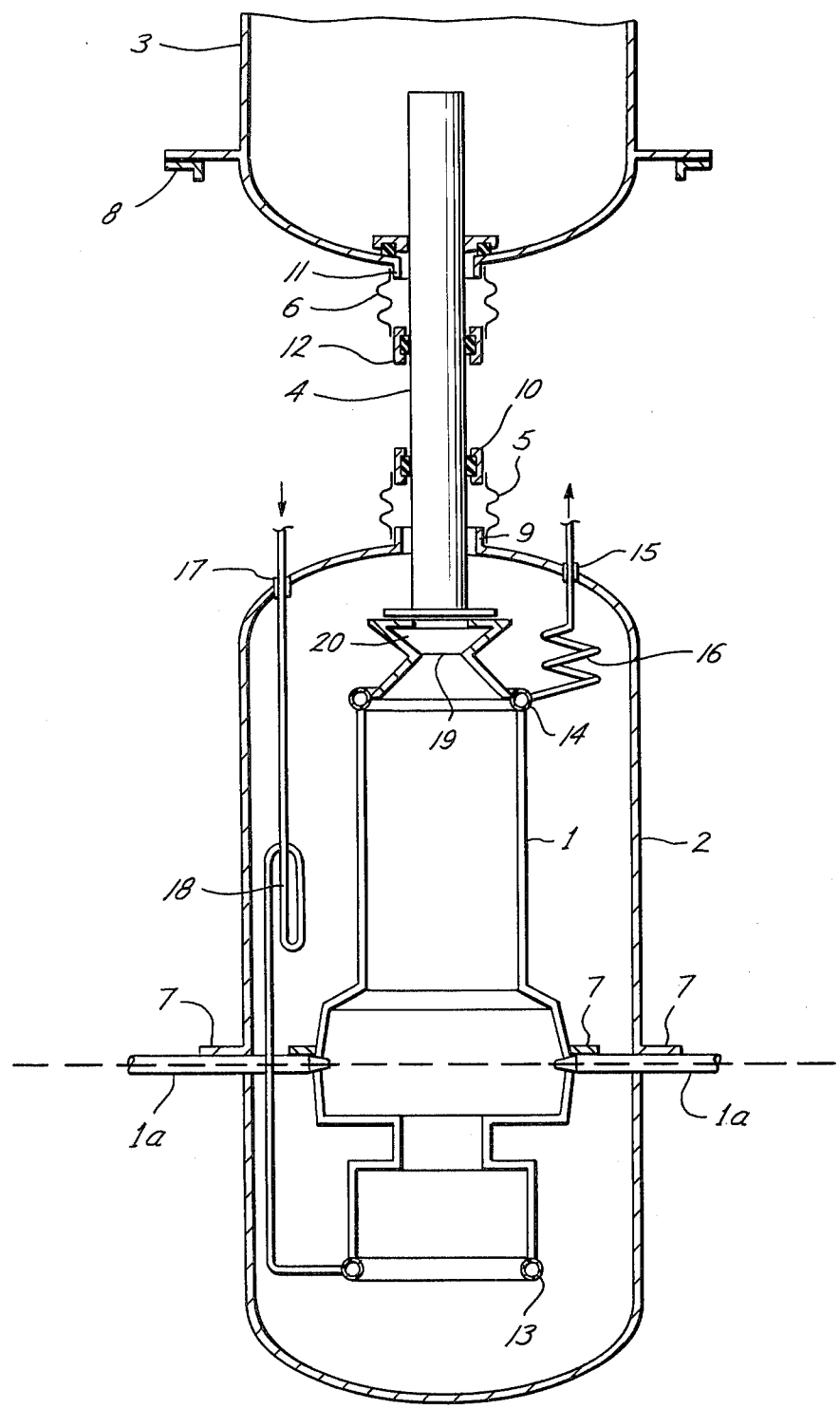

APPARATUS FOR GASIFICATION OF FINELY DIVIDED FUEL

BACKGROUND OF THE INVENTION

The present invention relates to apparatus for gasification of finely divided solid or liquid fuels, such as coal.

In gasification of coal, on leaving a gasifier the gas had a temperature at which the ash had a high fluidity, as a rule higher than 1400° C. The emerging gas contained a mist of molten slag particles. For further processing, the crude product gas had to be cooled down to a lower temperature, such as about 300° C. Slag from ash in the coal was usually sticky in the temperature range of from about 1500°–900° C. In this temperature range, difficulties tended to arise due to the tendency of the sticky slag to build up deposits on walls, outlets and the like. The slag deposits interfered with good operation of the gasification equipment, and could even lead to complete blocking of the equipment. Once the particles had cooled to a temperature where they were no longer sticky, they could be removed by known techniques such as cyclones, bend separators, filters and similar devices.

Although sometimes molten contaminants in a gas were so thinly liquid, i.e. non-viscous, that removal of the greater part thereof did not give any problems, as a rule a mist of molten particles remained behind in the gas, which upon cooling temporarily became sticky and then tended to cause the processing difficulties mentioned.

Further, during gasification operations, the very large temperature differences in the gasification apparatus from higher than 1400° C. in the gasification chamber down to a few hundred degrees centigrade in the waste heat boiler gave rise to severe thermal stresses in the various component parts of the apparatus.

SUMMARY OF INVENTION

The present invention relates to an apparatus for the gasification of finely divided solid or liquid fuels in suspension by reaction with oxygen-containing gases at elevated pressure, for instance a pressure between about 15 and 80 atmospheres gauge, comprising a gasification chamber, a gas cooling section and a waste heat boiler.

One object of the invention is to provide an apparatus which is so constructed that parts require servicing or repair only after long periods of operation, i.e. by making provision for the heat evolved in such a gasification process to be partly recovered in the gasification zone itself followed by rapid heat recovery in the cooling zone.

Another object of the invention now is to provide a cooling zone capable of cooling down the hot gases very rapidly through the critical temperature range in which solid contaminants in the gases may become sticky. It is a further object of the invention to provide means avoiding thermal stresses caused by large temperature differences.

To this end, according to the invention an apparatus for the gasification of finely divided fuels in suspension by reaction with oxygen-containing gases at an elevated pressure is provided, including a gasification chamber having a water tube wall structure arranged in an outer pressure shell. The gasification chamber and the pressure shell have a fixed support at the level of the center line of the burners or combustors present in the gasification chamber, with a tubular quench section being fixed on top of the gasification chamber and penetrating into a superposed waste heat boiler, which has a fixed support near the bottom thereof. Heat expansion means are provided in the connection between the gasification chamber and the pressure shell so as to absorb relative thermal expansion differences and, further, expansion means are provided to absorb thermal expansion differences between the waste heat boiler on the one hand and common thermal expansion of both the gasification chamber and the intermediate quench section on the other hand.

One advantage of the apparatus of the present invention is that a fixed support is present at the level of the burners or combustors in the gasification chamber. Accordingly, during operation, there is little or no risk that the combustors will become misaligned out of their axis. the combustors remain centered in position which is a factor of considerable significance for good performance of gasification apparatus due to thermal expansion of their supporting frames. Thermal expansion originates with the fixed support as a reference point and thermal expansion means are then provided remote from this fixed support level.

According to the invention, heat expansion means may be provided in a tubular part of the pressure shell surrounding the quench section and connected therewith. Heat expansion means may also be provided in a tubular part at the bottom of the waste heat boiler surrounding the quench section and connected therewith. Preferably, the thermal expansion means are longitudinally elastic elements of the tubular parts of the pressure shell and the waste heat boiler respectively, formed as corrugated bellow type sections on the tubular parts.

According to a preferred embodiment of the invention, the water tubes of the wall of the gasification chamber run from an inlet header to an outlet header, with a connection between the outlet header and an outlet in the pressure shell formed by a helically wound tube part, so as to be able to absorb relative thermal expansion between the gasification chamber and the pressure shell.

A supply tube between an inlet header and an inlet in the pressure shell is preferably provided with an expansion part such as a loop so as to be able to absorb thermal expansion differences between the tube on the one hand and both the pressure shell and lower part of the gasification chamber on the other hand.

BRIEF DESCRIPTION OF THE DRAWINGS

The invention will now further be illustrated with reference to the accompanying drawing showing schematically, by way of example, a preferred embodiment of the apparatus according to the invention.

DESCRIPTION OF PREFERRED EMBODIMENT

The apparatus shown comprises a gasification chamber 1 defined by a water tube wall structure which is arranged in an outer pressure shell 2. Further, a waste heat boiler 3 is provided as well as an intermediate quench section 4.

The gasification chamber 1 and the pressure shell 2 have a fixed support 7 at the level of a center line (shown as a dashed line) of the burners or combustors 1a present in the gasification chamber 1, and the tubular quench section 4 is fixed on top of the gasification chamber 1 and penetrates into the superposed waste heat boiler 3 which has a fixed support 8 near the bottom thereof.

Heat expansion means 5 are provided in the connection between the gasification chamber 1 and the pressure shell 2 so as to absorb relative thermal expansion differences. Further, heat expansion means 6 are provided to absorb thermal expansion differences between the waste heat boiler 3 on the one hand and common thermal expansion of both the gasification chamber 1 and the intermediate quench section 4 on the other hand. If desired, a suitable seal may be provided at the juncture of the waste heat boiler 3 and quench section 4.

The heat expansion means 5 are provided in a tubular part 9 of the pressure shell 2 surrounding the quench section and are connected in sliding seal contact therewith, as indicated schematically at 10. Further, the heat expansion means 6 are provided in a tubular part 11 at the bottom of the waste heat boiler 3 surrounding the quench section 4 and are connected in sliding seal contact therewith, as indicated schematically at 12.

The thermal expansion means 5 and 6 are longitudinally elastic elements of the tubular parts of the pressure shell 2 and the waste heat boiler 3, respectively, formed by corrugated bellow type sections 5, 6 of the tubular parts 9, 11.

The water tubes of the wall of the gasification chamber 1 run from an inlet header 13 to an outlet header 14. The connection of the outlet header 14 with an outlet 15 in the pressure shell 2 is formed by a helically wound tube part 16 so as to be able to absorb relative thermal expansion between the gasification chamber 1 and the pressure shell 2.

The supply tube between the inlet header 13 and an inlet 17 in the pressure shell 2 is provided with an expansion part such as a loop 18 so as to be able to absorb thermal expansion differences between the tube on the one hand and both the pressure shell 2 and lowermost portion of the gasification chamber 1 on the other hand.

At the top of the gasification chamber 1 a frustoconical part, which also may be a tubular wall, terminates in a throat outlet 19. Between the throat outlet 19 and the inlet end of the quench section 4 a chamber 20 is present, which may be provided with inlet means (not shown) for an inert cooling gas. Such provision is disclosed in co-pending British application No. 25539/75.

Finally, it should be noted that the invention is not limited to the embodiment as shown by way of example in the schematic drawing, wherein further parts forming no part essential to understanding of the invention by those of ordinary skill in the art have been omitted. For example, the expansion part 18 need not necessarily be in the form of a loop, but may also consist of a helical tube part or one or more U-shaped bends or the like. The same considerations apply to expansion part 16 which need not necessarily be a helix but can also be made similar as one of the embodiments mentioned in connection with expansion part 18 or may be in the form of a spirally wound tube.

The foregoing disclosure and description of the invention are illustrative and explanatory thereof, and various changes in the size, shape and materials as well as in the details of the illustrated construction may be made without departing from the spirit of the invention.

I claim:

1. In an apparatus for gasification of finely divided fuels in suspension by reaction with oxygen-containing gases at elevated pressure comprising a gasification chamber having combustors therein on a common center line and being contained in an outer pressure shell and a tubular quench section on top of said gasification chamber and penetrating into a superposed waste heat boiler, wherein said gasification chamber and said pressure shell have a common fixed support at the level of the center line of said combustors and said waste heat boiler has a fixed support near the bottom thereof, said gasification chamber, said pressure shell, said tubular quench section and said waste heat boiler being in axial alignment, the improvement comprising:
    (a) heat expansion means to absorb relative thermal expansion differences provided in a tubular part of said pressure shell surrounding said quench section and connected with said quench section;
    (b) further heat expansion means to absorb thermal expansion differences between said waste heat boiler and common thermal expansion of said gasification chamber and said intermediate quench section provided in a tubular part at the bottom of said waste heat boiler surrounding said quench section and connected with said quench section;
    (c) each of said heat expansion means comprising longitudinally elastic elements of tubular parts of said pressure shell and said waste heat boiler, respectively, formed by corrugated bellow type sections of said tubular parts.

2. Apparatus according to claim 1, wherein said gasification chamber has water tubes forming the wall thereof and running from an inlet header to an outlet header and wherein the improvement further comprises:
    (a) a tube connection of said outlet header with an outlet in said pressure shell formed by a helically wound tube part to absorb relative thermal expansion between said gasification chamber and said pressure shell;
    (b) a supply tube extending between an inlet header and an inlet in said pressure shell and provided with an expansion part in the form of a loop of the tube to absorb thermal expansion differences between said tube and both said pressure shell and a lower part of said gasification chamber.

* * * * *